Jan. 12, 1965                G. R. SAXTON ETAL                3,165,360
               AUTOMATIC MUD FLAP RETRACTOR FOR DUMP TRUCK VEHICLES
                              Filed Nov. 1, 1962
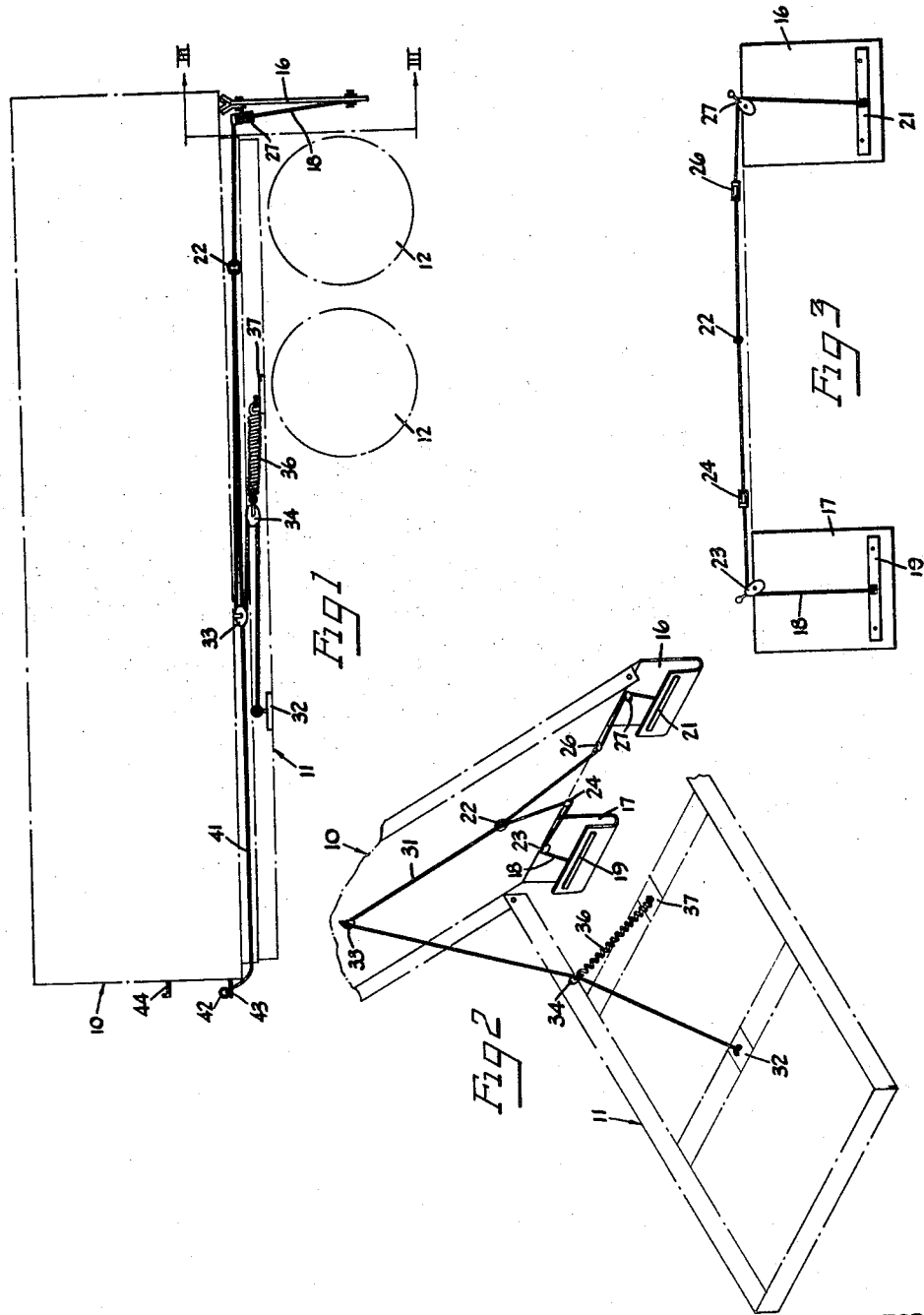
INVENTOR.
Charles L. Morganti
Gene R. Saxton
BY
ATTORNEYS

# United States Patent Office 3,165,360
Patented Jan. 12, 1965

3,165,360
AUTOMATIC MUD FLAP RETRACTOR FOR DUMP TRUCK VEHICLES
Gene R. Saxton, 31 N. Mason Ave., and Charles L. Morganti, 21 N. Mason Ave., both of Chicago, Ill.
Filed Nov. 1, 1962, Ser. No. 234,719
3 Claims. (Cl. 298—1)

The present invention relates to a device for retracting mud flaps from dump truck assemblies.

It is common practice to put mud flaps composed of hard rubber or the like adjacent the rear wheels of a dump truck assembly. However, when the dump box is raised, a part of the load may bury the flaps so that when the truck is moved forward, the flaps are torn from their supports. The present invention provides a device which automatically retracts the flaps when the dump box is being raised and restores them to normal running position when it is lowered. It is also within the scope of the present invention to provide a manually operable means for retracting the flaps regardless of the positioning of the dump box.

An object of the present invention is to provide an improved dump truck mechanism with means for automatically retracting the mud flaps and thereby preventing damage to the flaps when the dump box is raised.

A further object of the present invention is to provide an improved dump truck assembly including a retracting mechanism for the mud flaps which can be operated automatically or manually.

Another object of the invention is to provide an improved flap retracting device of the character described which can be installed on existing dump trucks and the like quickly and inexpensively.

Further objects and features of the present invention will be apparent to those skilled in the art from the following description of the attached sheet of drawings which illustrate a preferred embodiment of the invention.

In the drawings:

FIGURE 1 is a side elevational view of a dump box assembly embodying the principles of the present invention;

FIGURE 2 is a fragmentary view in perspective illustrating the flaps in their retracted position; and FIGURE 3 is a view taken substantially along the line III—III of FIGURE 1.

As shown in the drawings:

In FIGURE 1 reference numeral 10 indicates generally a dump box of the type employed on truck frames, the dump box 10 being mounted on a frame 11 for pivotal movement thereon, and being supported on one or more pairs of wheels 12. The specific details of the dump box, its means of attachment to the truck frame, the truck frame, and the hydraulic means for raising and lowering the dump box are well known in the art, and are not germane to the subject matter of the present invention. For the purpose of the present invention, it is merely necessary to illustrate that the dump box 10 has attached to it a pair of opposed mud flaps 16 and 17 for the purpose of providing a shield against mud, stones, or other objects which may be thrown up by the wheels. The flaps 16 and 17 will normally be composed of a relatively hard, but still flexible material such as hard rubber.

In accordance with the present invention, retraction means are provided for the mud flaps 16 and 17 which operate automatically when the dump box 10 is being raised to its dumping position as illustrated in FIGURE 2 of the drawings. To this end, we provide a cable 18 having one end secured to a steel plate 19 attached to the mud flap 17, and its opposite end secured to a plate 21 which in turn is secured to the mud flap 16. A central portion of the cable 18 is received in sliding relation within a cable ring 22. Tension applied to the cable ring 22 causes the flaps 16 and 17 to be retracted by bending the flaps upon themselves. To accommodate movement of the cable 18, there is provided a pair of pulleys 23 and 24 associated with the mud flap 17 and a pair of pulleys 26 and 27 associated with the mud flap 16. These sets of pulleys are anchored to an end portion of the dump box 10.

Tension is provided on the cable 18 by a second cable 31 having one end secured to the cable ring 22 and having its opposite end secured to a bracket 32 on the frame 11. The cable 31 is trained over a pulley 33 which is fastened to the underside of the dump box 10. Intermediate the pulley 33 and the bracket 32, there is provided a tensioning means which may take the form of a pulley 34 which rides on the run of the cable 31 extending between the bracket 32 and the pulley 33. Tension is applied to the cable 31 by the provision of a coil spring 36 which has one end secured to the pulley 34 and its opposite end secured to a bracket 37 on a cross member or other suitable part of the frame 11.

The normal running position of the mud guards 16 and 17 is illustrated in FIGURES 1 and 3 of the drawings. When the dump box 10 is raised, however, it will reach an elevation wherein the tension in the spring 36 applies a sufficient tensioning force on the cable 31 to lift the cable ring 22 in an upward direction, thereby retracting the flaps 16 and 17 into the position shown in FIGURE 2 by the corresponding tension applied to the cable 18. The flaps are then in an out of the way position and are not liable to the severe bending stresses which would occur if the flaps were permitted to hang free while the dump box 10 was being raised to its elevated position.

It is sometimes desirable to retract the end flaps even while the dump box 10 is in its lowered position. For this purpose, we provide another cable 41 which has one end secured to the cable ring 22 and its opposite end being provided with a ring 42 received within a bracket 43 secured to the dump box 10. Applying a pulling force to the ring 42 thereby has the same effect as raising the dump box in that it applies tension on the cable 18 which in turn causes the end flaps 16 and 17 to be retracted by bending them inwardly as illustrated in FIGURE 2 of the drawings. In the event that it should be desirable to hold the flaps 16 and 17 in their retracted positions, the dump box 10 may be provided with a hook 44 or the like on which the ring 42 can be fastened.

It should also be noted that with the device of the present invention, there is always a tension applied to the flaps, so that at high speeds, the flaps are held in normal running position, and are thus restrained against flapping away from the tires.

From the foregoing it should be evident that the retracting device of the present invention can be easily installed to existing dump boxes quickly and inexpensively. It should also be evident that various modifications can be made to the described embodiments without departing from the scope of the present invention.

We claim as our invention:

1. A dump truck assembly comprising a dump box arranged to be raised and lowered, a pair of mud flaps supported in spaced relation on said dump box, a first cable having its ends secured to said flaps, a second cable having one end secured to the frame of said dump truck forwardly of the hinge axis of said dump box and having its other end connected to said first cable, said second cable having an intermediate portion slidably supported by said dump box, and spring means extending between said second cable and said frame to tension said second cable upon raising of said dump box and thereby pull said first cable and retract said flaps.

2. A dump truck assembly according to claim 1 which also has a manually operable cable connected to said first cable to permit retraction of said flaps independently of the position of said dump box.

3. A dump truck assembly comprising a dump box arranged to be raised and lowered, a pair of end flaps supported in spaced relation on said dump box, a first cable having its ends secured to said flaps, a cable ring receiving said first cable therethrough in slidable relation, a second cable having one end secured to the frame of said dump truck forwardly of the hinge axis of said dump box and its other end secured to said cable ring, said second cable having an intermediate portion slidably supported by said dump box, and spring means extending between said second cable and said frame to tension said second cable and pull said cable ring, to thereby retract said flaps when said dump box is being raised.

References Cited in the file of this patent
UNITED STATES PATENTS

| | | |
|---|---|---|
| 2,721,760 | Lapham et al. | Oct. 25, 1955 |
| 2,981,553 | Zerbe | Apr. 25, 1961 |